June 18, 1963  J. L. S. DALEY ETAL  3,094,438
MULTI-PLATE GALVANIC CELL
Filed Feb. 25, 1960  2 Sheets-Sheet 1

INVENTORS
JOHN L. S. DALEY
WILLIAM J. NAGLE
RALPH M. FOECKING
BY Robert C. Cummings
ATTORNEY June 18, 1963  J. L. S. DALEY ETAL  3,094,438
MULTI-PLATE GALVANIC CELL Filed Feb. 25, 1960  2 Sheets-Sheet 2

INVENTORS
JOHN L. S. DALEY
WILLIAM J. NAGLE
RALPH M. FOECKING

BY Robert C. Cummings
ATTORNEY

United States Patent Office 3,094,438
Patented June 18, 1963

3,094,438
MULTI-PLATE GALVANIC CELL
John L. S. Daley, Bay Village, Ralph M. Foecking, North Olmsted, and William J. Nagle, Rocky River, Ohio, assignors to Union Carbide Corporation, a corporation of New York
Filed Feb. 25, 1960, Ser. No. 10,978
2 Claims. (Cl. 136—6)

This invention relates to novel multi-plate galvanic cells.

The principal object of the invention is to provide a multi-plate galvanic cell of simplified construction.

More specifically, one of the objects of the invention is to provide a multi-plate galvanic cell characterized by improved plate to terminal post contacts.

Another object of the invention is to provide improved means for sealing a multi-plate galvanic cell at the apertures where the terminal posts pass through the cell container.

A further object of the invention is to provide improved means for electrically connecting in series or parallel a plurality of multi-plate galvanic cells.

Broadly stated, the objects of the invention are accomplished by the provision of a multi-plate galvanic cell which comprises a container, a cover sealed on the container, and a plurality of positively and negatively charged plates disposed therein which are arranged alternately in a stack with a continuous separator or plurality of separators therebetween. Each of the plates is provided with a circular aperture at each end, one of which is smaller than the other. The plates are so oriented when they are stacked that the smaller apertures in the positive plates all reside at one end of the stack and the smaller apertures in the negative plates all at the other end of the stack. Plates of like polarity are electrically connected in parallel by circular terminal posts which pass through the apertures in the plates and make electrical contact with the edges of the smaller apertures. These terminal posts pass out through circular apertures in the container which are in alignment with the apertures in the plates, and in so doing, radially compress hard plastic gaskets between the terminal posts and the edges of the apertures in a tight radial seal.

The invention will be more readily understood by reference to the accompanying drawing wherein.

Figure 1:
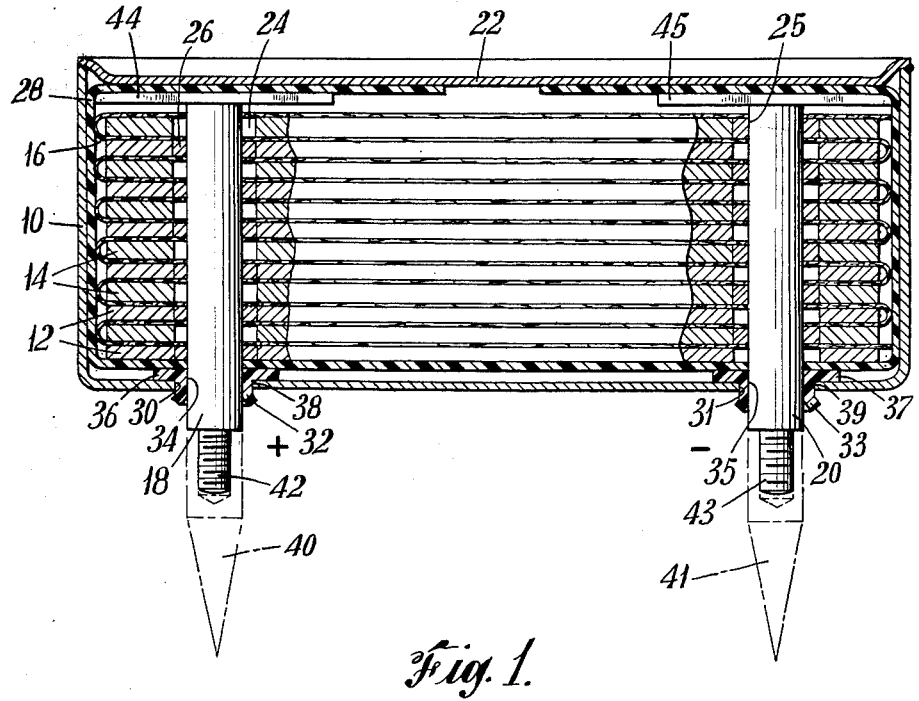
FIG. 1 is a partial vertical section of one embodiment of the cell of the invention.

Referring now to FIG. 1, the cell of the invention comprises a container 10, a plurality of positive plates 12 and negative plates 14 arranged alternately in a stack with a continuous separator 16 disposed between them, a terminal post 18 electrically connecting all the positive plates 12, another terminal post 20 electrically connecting all the negative plates 14, and a cover 22 for the container 10.

In the manufacture of the cell of the invention, the positive plates 12 and the negative plates 14 are made to similar shape specifications, each plate being slightly smaller than the inside of the container 10. In one example of the invention, both the positive plates 12 and the negative plates 14 may be sintered nickel plaques which are identical except for the active material content, the positive plates 12 containing nickelous hydroxide and the negative plates 14 containing cadmium hydroxide.

Prior to stacking, each plate is provided with one circular aperture 24 and a smaller circular aperture 25. Each plate has the apertures 24, 25 in the same position, preferably somewhere along the long axis of symmetry.

Figure 2:
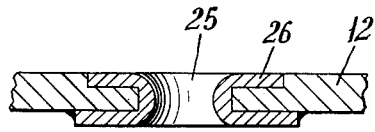
FIG. 2 is a fragmentary vertical section of a plate that may be used in the practice of the invention.

The apertures 25 may be made initially smaller than the apertures 24, or as shown more clearly in FIG. 2, a suitable way of providing an aperture 25 of reduced diameter in each plate 12, 14 is by having an eyelet 26, preferably of nickel, secured therein, suitably by welding. Another method of providing an aperture 25 of reduced diameter is by securing a thin nickel washer of smaller diameter over the original aperture that is provided.

Referring again to FIG. 1, the plates 12, 14 are so oriented during stacking that the apertures 25 in the positive plates 12 that are provided with the eyelets 26 are at one end of the stack, and the apertures 25 in the negative plates 14 that are provided with the eyelets 26 are at the other end of the stack. During the stacking process, the continuous separator 16 is wound between each positive plate 12 and negative plate 14, although, if desired, a plurality of separators may be employed. Prior to insertion within the container 10, the stack of positive plates 12 and negative plates 14 is wrapped with a layer 28 of a semi-rigid insulating material, suitably sheet vinyl or polyethylene. This insulating layer 28 may completely enclose the stack of plates 12, 14, or the stack may be left uncovered at the top until after the terminal posts 18, 20 have been driven through the cell.

The container 10, in which the insulated stack of positive plates 12 and negative plates 14 is placed, is provided with two circular apertures 30, 31 which are in alignment with the apertures 24, 25 in the plates 12, 14. The apertures 30, 31 in the container 10 are provided with hard plastic flanged gaskets 32, 33 preferably of hard nylon, sized such that the sealing surfaces 34, 35 fit the apertures 30, 31 in the container 10 and the flanges 36, 37 prevent the gaskets 32, 33 from passing through the apertures 30, 31. If the electrolyte which is employed in the cell is acid rather than alkaline then the seal gasket 32, 33 should suitably be made of linear polyethylene rather than nylon. In either event, a very thin layer of asphalt may be applied to the gaskets 32, 33 to facilitate sealing.

To complete the assembly of the cell of the invention, the stack of properly aligned plates is placed in the open container 10 with the apertures 24, 25 in the plates in alignment with the apertures 30, 31 in the container 10, and the circular terminal posts 18, 20, suitably rods of nickel or nickel plated steel and having diameters slightly larger than the diameter of the eyelets 26 and the gaskets 32, 33 are driven through the assembly. Due to the relative diameters of the terminal posts 18, 20 and the eyelets 26, all plates of like polarity are connected in parallel. In addition, as the terminal posts 18, 20 pass through the apertures 30, 31 in the container 10, the gaskets 32, 33 are radially compressed between the terminal posts 18, 20 and the edges 38, 39 of the circular apertures 30, 31 thereby effecting a tight radial seal.

The pins which serve as the terminal posts 18, 20 may be tapered at the nose but preferably they are fitted with removable tapered nose sections 40, 41 which ease their passage through the insulating layer 28, the sligthly undersized eyelets 26, the separator 16, and the undersized gaskets 32, 33. The portions of the terminal posts 18, 20 extending outside the container 10 serve as external terminals 42, 43. If desired the internal ends of the terminal posts 18, 20 may be provided with flat sided heads 44, 45 to prevent the turning of the terminal posts 18, 20.

Subsequent to the placement of both terminal posts 18, 20, the cell is wetted with electrolyte and the cover 22 is secured to the container 10, suitably by welding.

Figure 3:
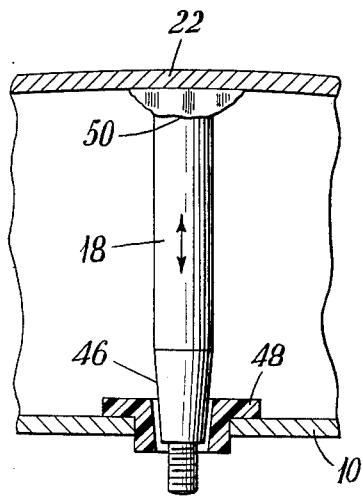
FIG. 3 is a fragmentary vertical section of a modified arrangement of one of the terminal posts of the cell of FIG. 1.

A modification of the above construction is illustrated in FIG. 3 wherein one of the terminal posts 18 or 20 is positioned in or near the center of one rectangular side of the container 10, and is tapered at 46 where it passes through a flanged hard nylon seal gasket 48. The upper end 50 of the terminal post 18 is secured to the container cover 22, suitably by welding. In this construction, an unusually high or dangerous gas pressure within the sealed cell would cause bulging of the container 10, thereby causing the gasket 48 and the tapered section 46 of the terminal post 18 or 20 to separate, thus venting the cell. Once the cell is vented and the pressure diminished, the terminal post 18 or 20 would reseat against the gasket 48.

Figure 5:
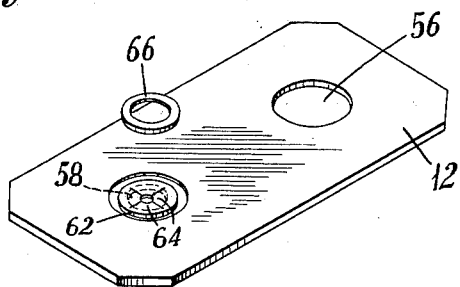
FIG. 5 is an exploded view of the members involved in the terminal post to plate contact employed in one embodiment of the invention.
Figure 6:
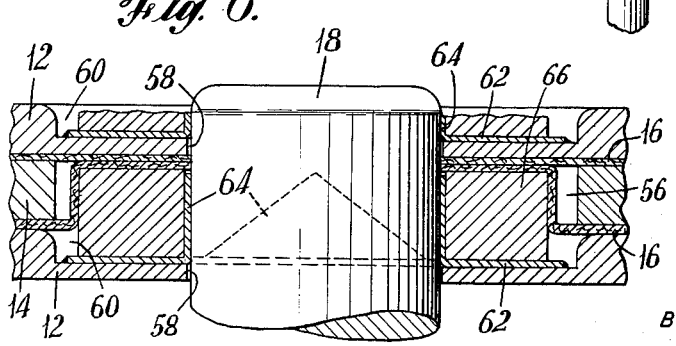
FIG. 6 is a fragmentary vertical section of a cell in which the terminal post to plate contact of FIG. 5 is employed.

FIGS. 5 and 6 of the drawing illustrate another and a preferred way of making the terminal post to plate contact. In the practice of this embodiment, two apertures 56 and 58 are punched in the plates 12, 14, the aperture 56 having approximately twice the diameter of aperture 58. The plate 12 or 14 is then compressed around the smaller aperture 58 over an area 60 of a diameter slightly in excess of the diameter of the larger aperture 56. A nickel contact washer 62 is then welded over the compressed area 60. This washer is split in the middle so as to form deflectable tabs 64. A spacer washer 66 is then placed on top of the nickel contact washer 62. A plurality of oppositely charged plates 12 and 14 with a separator 16 therebetween, may then be arranged in a stack as shown in FIG. 6, the plates 12 and 14 in the stack being so oriented that all the smaller apertures 58 in the positive plates 12 are at one end of the stack and all the smaller apertures 58 in the negative plates 14 are at the other end of the stack. After the plates 12 and 14 have been so arranged the terminal posts 18, 20 may then be driven through the stack to connect plates of like polarity. When the terminal posts 18, 20 pass through the smaller apertures 58 of the respective plates, the tabs 64 in the washer 62 are pushed up and locked against the respective posts 18 or 20 in a tight radial seal by the spacer washer 66 which has a slightly smaller diameter than the diameter of the posts 18 or 20. The diameter of the larger aperture 56 is of course greater than the diameter of the terminal posts 18 and 20.

Figure 4:
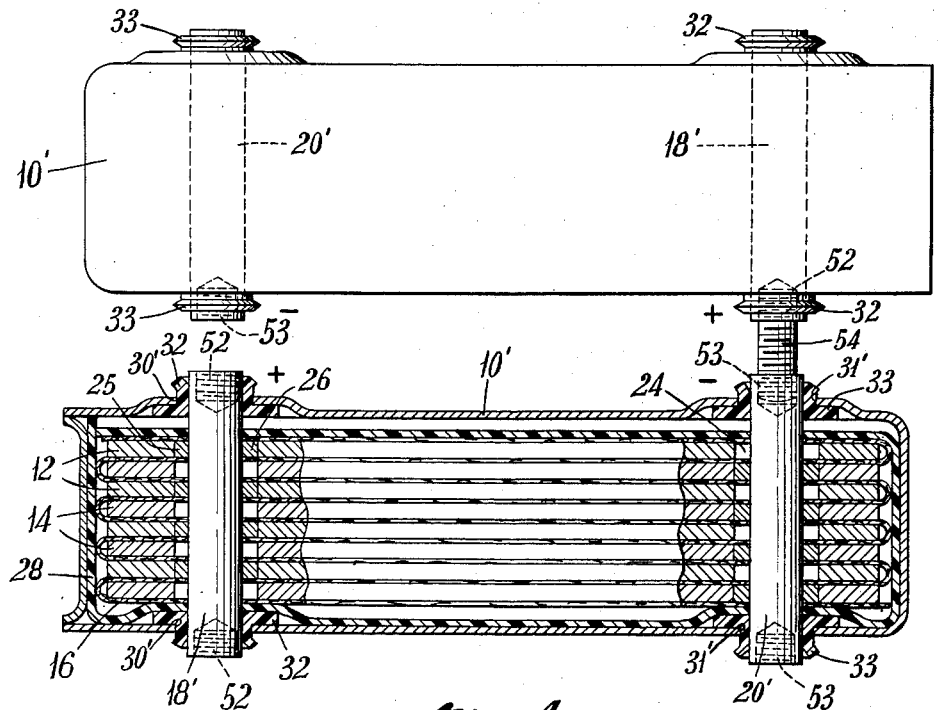
FIG. 4 is a front elevation, partially in section, showing two modified cells of the invention electrically connected in a series relation.

The cells of the invention may be more readily connected in parallel or series with each other if they are modified as shown in FIG. 4. In constructing this embodiment of the invention, the oppositely charged plates 12, 14 are stacked exactly as outlined above, i.e., they are oriented so that the apertures 25 in the positive plates 12 that are provided with eyelets 26 are at one end of the stack, and the apertures 25 in the negative plates 14 that are provided with eyelets 26 are at the other end of the stack. This stack with a separator 16 between alternate plates 12 and 14 is then wrapped with a layer 28 of semi-rigid insulating material and inserted endwise into the container 10'. The container 10' is provided with apertures 30', 31' on both the top and bottom which are in alignment with the apertures 24, 25 in the plates 12, 14. All of the apertures 30', 31' in the container 10' are provided with hard plastic flanged gaskets 32, 33 of the type discussed above.

In this embodiment, the circular terminal posts 18', 20' which are of a slightly larger diameter than the diameters of the eyelets 26 and gaskets 32, 33 and which are driven through the assembly to electrically connect the plates of like polarity and to radially seal the apertures 30', 31' in the container 10' are tapped at both ends 52, 53, which extend outside the container 10'. As shown in FIG. 4, cells so constructed may be very simply connected in series by use of a threaded connecting stud 54, which is threaded into the tapped positive terminal post 18' of one cell and into the tapped negative terminal post 20' of another cell.

If desired to connect such cells in parallel it is merely necessary to use two connecting studs 54, one of which connects the positive terminal post 18' of one cell to the positive terminal post 18' of another cell, and the other of which similarly connects the negative terminal posts 20'.

While the above discussion is directed generally to sealed cells, the novel terminal posts to plate contacts which are disclosed are also applicable to open cells.

We claim:

1. In a multi-plate galvanic cell comprising an open container, a plurality of positively charged plates and negatively charged plates disposed in said container, and an electrolyte in contact with said plates, said plates being arranged alternately in a stack with separators therebetween and being insulated from said container by a layer of semi-rigid insulating material, each of said plates having two circular apertures therein, one of said apertures in each of said plates having a smaller diameter than said other apertures, said plates being so oriented in said stack that said smaller apertures of said positive plates are at one end of said stack and said smaller apertures of said negative plates are at the other end of said stack; the improvement which comprises circular terminal posts having a smooth surface passing through said apertures, metallic contact washers having radial slots therein provided over said smaller apertures, and a plastic spacer washer disposed between said contact washers and said separators, said terminal posts having a diameter slightly larger than the inside diameter of said spacer washers so that when said terminal posts are passed through all of said washers in said plates, the tabs formed by said radial slots of said contact washers distort and deflect towards and against said spacer washers thereby providing good electrical contact by a tight radial seal between said posts and said slotted contact washers in said plates.

2. In a sealed multi-plate galvanic cell comprising a sealed container provided with two circular apertures in the bottom which are fitted with hard plastic gaskets, a plurality of positively charged and negatively charged plates disposed in said container and electrolyte in contact with said plates, said plates being arranged alternately in a stack with separators therebetween and being insulated from said container by a layer of semi-rigid insulating material, each of said plates having two circular apertures therein in alignment with said apertures in said container, one of said apertures in each of said plates having a smaller diameter than said other aperture, said plates being so oriented in said stack that said smaller apertures of said positive plates are at one end of said stack and said smaller apertures of said negative plates are at the other end of said stack; the improvement which comprises circular terminal posts having a smooth surface passing through said apertures, metallic contact washers having radial slots therein provided over said smaller apertures, and a plastic spacer washer disposed between said contact washers and said separators, said terminal posts having a diameter slightly larger than the inside diameter of said spacer washers so that when said terminal posts are passed through all of said washers in said plates, the tabs formed by said radial slots of said contact washers distort and deflect towards and against said spacer washers thereby providing good electrical contact by a tight radial seal between said posts and said slotted contact washers in said plates, said terminal posts also passing through said apertures in said container thereby radially compressing said hard plastic gaskets between said terminal posts and the edges of said apertures in a tight radial seal.

References Cited in the file of this patent

UNITED STATES PATENTS

| 2,849,522 | Garine | Aug. 26, 1958 |
| 2,883,447 | Dahl | Apr. 21, 1959 |
| 2,928,888 | Vogt | Mar. 15, 1960 |
| 2,937,358 | Bulger | May 17, 1960 |

FOREIGN PATENTS

| 929,024 | France | June 23, 1947 |